Sept. 26, 1972   H. M. DEMAREST, JR   3,694,180

GLASS ROLLING APPARATUS AND METHOD

Filed April 15, 1971

INVENTOR
HENRY M. DEMAREST JR.

BY

ATTORNEYS

United States Patent Office 3,694,180
Patented Sept. 26, 1972

3,694,180
GLASS ROLLING APPARATUS AND METHOD
Henry M. Demarest, Jr., Natrona Heights, Pa., assignor to PPG Industries, Inc., Pittsburgh, Pa.
Continuation-in-part of application Ser. No. 796,713, Feb. 5, 1969. This application Apr. 15, 1971, Ser. No. 134,161
Int. Cl. C03b *13/16*
U.S. Cl. 65—101                                  10 Claims

ABSTRACT OF THE DISCLOSURE

A shaping member or gun for controlling the width of a rolled glass ribbon is constructed of a refractory material which will operate at temperatures on the order of about 2800 degrees Fahrenheit to 2900 degrees Fahrenheit, such as refractories containing high alumina or high silica. The use of such a gun for the rolling of a high-temperature glass, vitrifying at about 2800 degrees to 2900 degrees Fahrenheit, is considered essential for the practical rolling of such glass.

CROSS-REFERENCE TO RELATED APPLICATION

Figure 1:
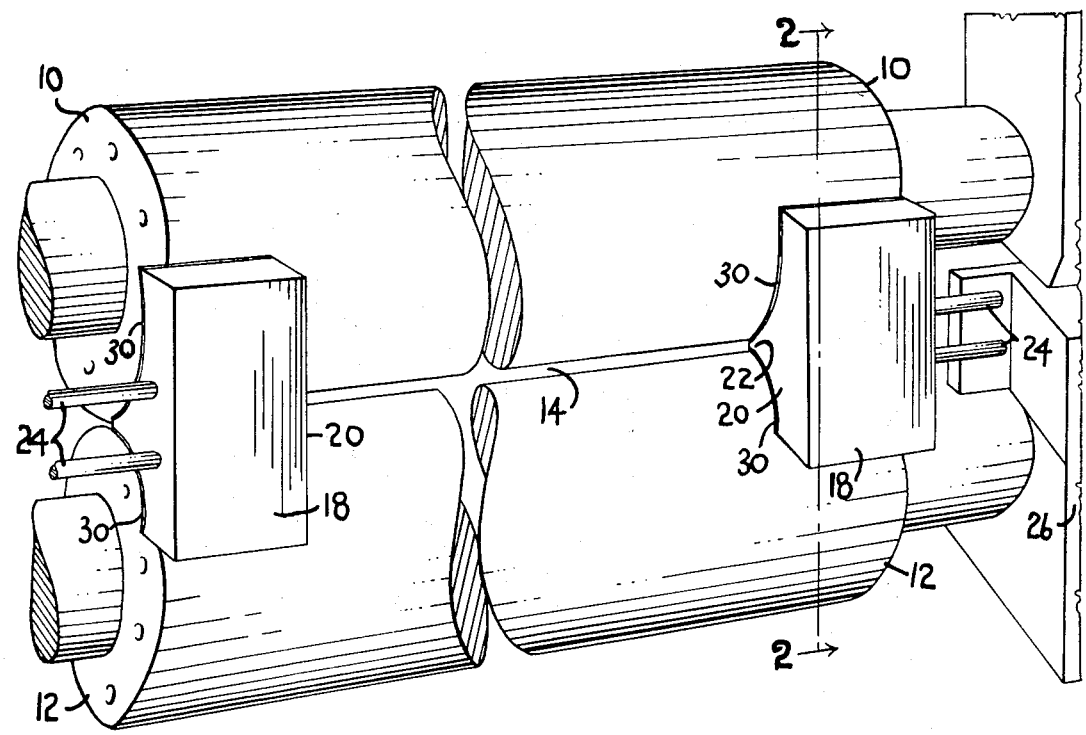

This application is a continuation-in-part of my earlier filed application Ser. No. 796,713, now abandoned filed Feb. 5, 1969.

BACKGROUND OF THE INVENTION

Edge forming members or guns are broadly old in the art and are used to control the edges of a glass ribbon as it is formed between the forming rolls of a rolling apparatus. Such guns prevent devitrification of the glass edges of the ribbon by preventing undue chilling of the edges before the ribbon passes into an annealing lehr. Conventional forming guns are illustrated in U.S. Pats. Nos. 1,954,077, 1,928,023 and 1,928,024. The guns shown and described in these patents are hollow metal structures heated internally by gas flames. Another metal gun is shown in U.S. Pat. No. 2,941,334. This metal gun is electrically heated, the metal being a resistance in an electrical circuit.

The guns shown in the prior art operate satisfactorily when the glass is of a conventional plate composition, wherein devitrification of the glass occurs at a temperature below about 2000 degrees Fahrenheit. However, the material of these guns cannot withstand temperatures on the order of about 2800 degrees Fahrenheit to 2900 degrees Fahrenheit as when rolling a glass which devitrifies at a temperature about 2300 degrees Fahrenheit to 2500 degrees Fahrenheit, or vitrifies at about 2800 degrees to 2900 degrees Fahrenheit.

THE INVENTION

According to this invention, edge guns for a glass rolling machine are constructed of a refractory material having a high content of alumina or silica. For example, refractory materials containing about 80 percent by weight and above of alumina and the remainder silica (with perhaps minor traces of other materials, usually less than 1 percent by weight) or 99 percent by weight silica (and the remainder alumina and minor traces of other materials) are satisfactory.

The refractory material requirements for the edge guns are:

(1) Thermal shock resistance—the ability to withstand the shock of a high starting temperature, as on the order of 1000 degrees Fahrenheit suddenly being raised to operating temperature as on the order of about 2700 degrees Fahrenheit to 2900 degrees Fahrenheit by contact with hot glass, without deterioration and without being preheated, as with a gas burner.

(2) Low thermal expansion—the ability to withstand temperatures on the order of about 2700 degrees Fahrenheit to 2900 degrees Fahrenheit on the operating class contacting face and temperatures on another, cold face of temperatures on the order of about 700 degrees Fahrenheit to 1000 degrees Fahrenheit.

(3) Resistance to dissolution in hot glass.

(4) Low thermal conductivity to retain the heat in the glass rather than dissipate the heat to the rolls and the ambient atmosphere and thus prevent devitrification of the edges of the glass.

(5) Economy—low cost material, relatively long life.

Materials which meet the requirements above are manufactured and sold under various trade names, as for example:

(a) Puro-Tab—a castable 94 percent alumina, fired after cast, and manufactured by Kaiser Refractories.

(b) Monofrax—a fusion cast refractory containing 94 percent–99 percent alumina, manufactured by the Monofrax Corporation.

(c) Silfrax—a 99.7 percent silica slip cast or dense cast refractory manufactured by The Carborundum Company.

(d) A castable 90 percent alumina refractory manufactured by Taylor Refractories and also The Carborundum Company.

In order to reduce the quantity of heat dissipated by the guns to the rolls of the rolling machine, a layer of an insulating material, such as Fiberfrax can be bonded to the faces of the guns adjacent the rolls. Fiberfrax is a fibrous insulating material manufactured by The Carborundum Company and produced from aluminum oxide and silica which will withstand temperatures on the order of about 2500 degrees Fahrenheit.

THE DRAWING

Figure 2:
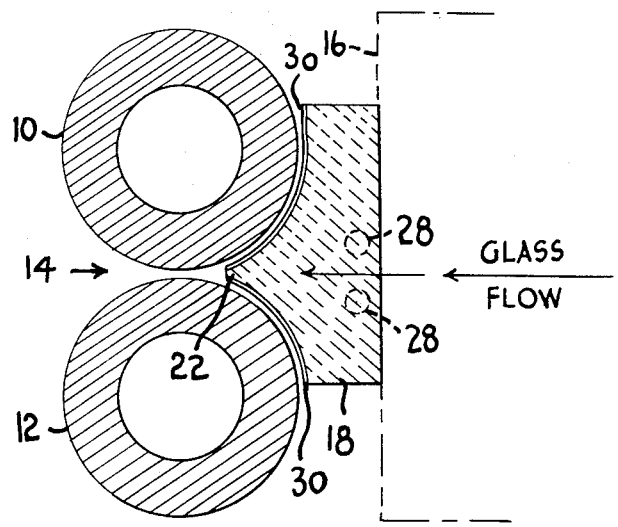

FIG. 1 is an illustration showing the edge forming members or guns positioned in their operation location and looking from the tank side of the assembly; and FIG. 2 is a sectional view taken on line II—II of FIG. 1 and indicating in broken lines the exit of a glass melting tank with a legend indicating the direction of glass flow.

THE PREFERRED EMBODIMENT

As is illustrated, there is shown a pair of forming rolls 10, 12 which are adjusted so as to provide a space 14 therebetween which determines the thickness of the glass being rolled. These rolls may be constructed of any suitable metal, such as steel, and are generally water cooled. Also, a knurled pattern is generally cut into the rolling surfaces. The rolls are suitably journaled and are power-driven. To determine the width of the glass ribbon being rolled, the glass of which is discharged from the lip of a glass-melting tank 16, a pair of edge members or guns 18, 18 is provided. These guns are shaped as shown to present a flat face 20 to the edges of the glass and a portion 22 which closely projects into the substantially V-shaped space or bite between the rolls. Suitable rods 24 from a bracket 26 support the member 18 in operating position. The rods 24 are received in openings 28 in the members 18. If desired, an insulating material 30, such as Fiberfrax, is attached to the surfaces of the members most closely adjacent the rolls.

In its method aspect, the instant invention relates to a method of rolling a high-temperature glass, i.e., one that vitrifies at a temperature of about 2800 degrees Fahrenheit to 2900 degrees Fahrenheit. An example of such glass is one having the following composition in weight percent: 19.5 percent $Al_2O_3$, 4.0 percent $Li_2O$, 1.5 percent $ZrO_2$, 1.6 percent $ZnO$, 1.5 percent $TiO_2$, 1.0–2.0 percent of fining agents and/or modifiers, balance substantially silica, together with impurities in minor amounts that do not affect the properties substantially. In its method aspect, the invention comprises the practice of rolling to sheet or ribbon forms a glass that vitrifies at about 2800 degrees Fahrenheit to 2900 degrees Fahrenheit, especially a glass of the above-stated composition, with the use of a pair of forming rolls and a refractory gun at each end of said pair of forming rolls, closing the end of a substantially V-shaped space between said rolls, each of said guns having an edge surface to contact the edges of a glass ribbon being formed between said rolls, each of said refractory guns being made of refractory material selected from the group consisting of the high-alumina and the high-silica refractories capable of use at about 2700 degrees Fahrenheit to 2900 degrees Fahrenheit.

I claim:
1. In a glass ribbon rolling apparatus which includes a pair of forming rolls, the improvement which comprises,
   a refractory gun at each end of the pair of rolls closing the end of the substantially V-shaped space between the rolls, each gun having an edge surface to contact the edges of a glass ribbon being formed between the rolls,
   each refractory gun being constructed of a refractory material capable of being used at temperatures on the order of about 2700 degrees Fahrenheit to about 2900 degrees Fahrenheit.
   said apparatus further including a fibrous insulating material on a portion of the refractory members adjacent said rolls.
2. Apparatus as recited in claim 1 in which said refractory material is selected from the group consisting of high alumina and high silica refractories.
3. Apparatus as recited in claim 2 in which said refractory material contains about 80 percent by weight of alumina.
4. Apparatus as recited in claim 3 in which said refractory material contains about 90 percent by weight of alumina and the remainder substantially silica.
5. Apparatus as recited in claim 2 in which said refractory material contains about 99 percent by weight of silica.
6. A method of rolling to sheet or ribbon form a high-temperature glass that vitrifies at about 2800 degrees Fahrenheit to 2900 degrees Fahrenheit, said method comprising passing said glass in molten form at a temperature of from about 2700° F. to about 2900° F. between a pair of forming rolls having at each end of said pair of forming rolls a refractory gun having curved surfaces covered with a layer of a heat insulating material so that said curved surfaces serve to close a substantially V-shaped space between said forming rolls, each of said guns having an edge surface to contact the edges of a glass ribbon being formed between said forming rolls, and each of said refractory guns being made of material selected from the group consisting of the high-alumina and high-silica refractories capable of use at about 2700 degrees Fahrenheit to 2900 degrees Fahrenheit.
7. A method as defined in claim 6, characterized in that said glass has the following composition in weight percent: 19.5 percent $Al_2O_3$, 4.0 percent $Li_2O$, 1.5 percent $ZrO_2$, 1.6 percent ZnO, 1.5 percent $TiO_2$, 1.0–2.0 percent of fining agents and/or modifiers, balance substantially silica, together with impurities in minor amounts that do not affect the properties substantially.
8. A method as defined in claim 6, further characterized in that said refractory material contains about 80 weight percent of alumina.
9. A method as defined in claim 6, further characterized in that said refractory material contains about 90 weight percent of alumina and the remainder substantially silica.
10. A method as defined in claim 6, further characterized in that said refractory material contains about 99 weight percent of silica.

References Cited
UNITED STATES PATENTS

| | | | |
|---|---|---|---|
| 1,593,567 | 7/1926 | Byrnes | 65—374 X |
| 2,196,075 | 7/1936 | Logan | 65—378 X |
| 2,243,149 | 5/1941 | Despret | 65—185 X |

ARTHUR D. KELLOGG, Primary Examiner

U.S. Cl. X.R.

65—185, 199, 201, 253, 374